United States Patent
Zhang et al.

(10) Patent No.: US 11,368,243 B2
(45) Date of Patent: Jun. 21, 2022

(54) CODEWORD ADAPTATION FOR NON-ORTHOGONAL CODED ACCESS

(71) Applicant: Nokia Technologies Oy, Espoo (FI)

(72) Inventors: Yuantao Zhang, Beijing (CN); Zhuyan Zhao, Beijing (CN); Jingyuan Sun, Beijing (CN); Hongchao Li, Beijing (CN); Deshan Miao, Beijing (CN); Yanji Zhang, Beijing (CN); Klaus Ingemann Pedersen, Aalborg (DK); Mihai Enescu, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 88 days.

(21) Appl. No.: 16/302,248

(22) PCT Filed: May 26, 2016

(86) PCT No.: PCT/CN2016/083435
§ 371 (c)(1),
(2) Date: Nov. 16, 2018

(87) PCT Pub. No.: WO2017/201704
PCT Pub. Date: Nov. 30, 2017

(65) Prior Publication Data
US 2019/0273576 A1   Sep. 5, 2019

(51) Int. Cl.
*H04L 1/00* (2006.01)
*H04B 1/7073* (2011.01)
*H04L 5/00* (2006.01)

(52) U.S. Cl.
CPC ........ *H04L 1/0011* (2013.01); *H04B 1/70735* (2013.01); *H04L 1/0003* (2013.01);
(Continued)

(58) Field of Classification Search
CPC ... H04L 1/0011; H04L 1/0009; H04L 1/0003; H04L 1/0007; H04L 1/0057; H04L 5/0016; H04B 1/70735; G01R 33/4833
(Continued)

(56) References Cited

U.S. PATENT DOCUMENTS

| | | | |
|---|---|---|---|
| 2005/0100038 A1* | 5/2005 | Pietraski | H04W 28/0205 370/437 |
| 2009/0040969 A1* | 2/2009 | Kim | H04W 28/06 370/328 |

(Continued)

FOREIGN PATENT DOCUMENTS

| | | |
|---|---|---|
| CN | 101741517 A | 6/2010 |
| CN | 104092516 A | 10/2014 |

(Continued)

OTHER PUBLICATIONS

"New SID Proposal: Study on New Radio Access Technology", 3GPP TSG-RAN meeting #71, RP-160671, Agenda: 9.1, NTT Docomo, Mar. 7-10, 2016, 8 pages.
(Continued)

*Primary Examiner* — Albert Decady
*Assistant Examiner* — Osman M Alshack
(74) *Attorney, Agent, or Firm* — Squire Patton Boggs (US) LLP

(57) ABSTRACT

Various communication systems may benefit from improved transmissions. For example, a network transmission may benefit from improved throughput and efficiency in non-schedule multiple access communications. A method includes selecting at a user equipment operating in a non-scheduled access scheme at least one of a first codeword or a second codeword based on an amount of data. The data in the non-scheduled access scheme can be spread according to a spreading sequence. The method also includes determining
(Continued)

a transport block size for at least one of the first codeword or the second codeword. In addition, the method includes transmitting the data from the user equipment to a network node using at least one of the first codeword or the second codeword.

18 Claims, 9 Drawing Sheets

(52) U.S. Cl.
CPC .......... *H04L 1/0007* (2013.01); *H04L 1/0009* (2013.01); *H04L 1/0057* (2013.01); *H04L 5/0016* (2013.01)

(58) Field of Classification Search
USPC .................. 714/729, 752, 758, 748–750
See application file for complete search history.

(56) References Cited

U.S. PATENT DOCUMENTS

| | | | |
|---|---|---|---|
| 2011/0064042 A1* | 3/2011 | Kim ...................... | H04L 5/0094 370/329 |
| 2013/0010720 A1* | 1/2013 | Lohr ..................... | H04L 5/0053 370/329 |
| 2013/0163528 A1* | 6/2013 | Kim .................... | H04W 52/367 370/329 |
| 2013/0163537 A1* | 6/2013 | Anderson ............. | H04L 1/1671 370/329 |
| 2013/0208705 A1* | 8/2013 | Ko .......................... | H04B 7/04 370/335 |
| 2013/0343348 A1 | 12/2013 | Luo et al. | |
| 2014/0037019 A1* | 2/2014 | Akkarakaran ........ | H04L 1/1822 375/267 |
| 2014/0064203 A1* | 3/2014 | Seo ..................... | H04L 1/1854 370/329 |
| 2014/0286283 A1* | 9/2014 | Kim .................... | H04W 52/243 370/329 |
| 2015/0326360 A1* | 11/2015 | Malladi ............... | H04L 27/3488 370/329 |
| 2016/0119073 A1 | 4/2016 | Vilaipornsawai et al. | |
| 2016/0211867 A1* | 7/2016 | Guillemette ....... | H03M 13/1114 |
| 2016/0294457 A1* | 10/2016 | Lee ..................... | H04B 7/0663 |
| 2017/0290052 A1* | 10/2017 | Zhang ................. | H04W 74/004 |

FOREIGN PATENT DOCUMENTS

| | | |
|---|---|---|
| CN | 104823384 A | 8/2015 |
| CN | 105356971 A | 2/2016 |
| CN | 105515608 A | 4/2016 |
| CN | 110650542 A | 1/2020 |
| EP | 2 795 935 A1 | 10/2014 |
| EP | 3258728 A1 | 12/2017 |
| WO | 2007/097544 A1 | 8/2007 |
| WO | 2013/096551 A1 | 6/2013 |

OTHER PUBLICATIONS

"3rd Generation Partnership Project; Technical Specification Group Radio Access Network; Study on Scenarios and Requirements for Next Generation Access Technologies; (Release 14)", 3GPP TR 38.913, V0.2.0, Feb. 2016, pp. 1-19.
"Uplink Contention-based Access in 5G New Radio", 3GPP TSG-RAN WG1 meeting #84-BIS, R1-162892, Agenda: 8.1.4.2, Nokia, Apr. 11-14, 2016, 3 pages.
"Sparse Code Multiple Access (SCMA) for 5G Radio Transmission", 3GPP TSG-RAN WG1 meeting #84bis, R1-162155, Agenda: 8.1.4.2, Huawei, Apr. 11-15, 2016, 5 pages.
"NR Multiple Access Requirements", 3GPP TSG-RAN WG1 meeting #84bis, R1-162201, Agenda: 8.1.4.2, Qualcomm Incorporated, Apr. 11-15, 2016, pp. 1-3.
"Discussion on Multiple Access for New Radio Interface", 3GPP TSG-RAN WG1 meeting #84bis, R1-162226, Agenda: 8.1.4.2, ZTE, Apr. 11-15, 2016, pp. 1-12.
"Initial Views and Evaluation Results on Non-Orthogonal Multiple Access For NR Uplink", 3GPP TSG-RAN WG1 meeting #84bis, R1-163111, Agenda: 8.1.4.2, NTT Docomo, Inc, Apr. 11-15, 2016, pp. 1-6.
"Considerations on DL/UL multiple access for NR", 3GPP TSG-RAN WG1 meeting #84bis, R1-162517, Agenda: 8.1.4.2, LG Electronics, Apr. 11-15, 2016, 4 pages.
"Candidate Solution for New Multiple Access", 3GPP TSG-RAN WG1 meeting #84bis, R1-163383, Agenda: 8.1.4.2, CATT, Apr. 11-15, 2016, pp. 1-4.
"Multiple Access Schemes for New Radio Interface", 3GPP TSG-RAN WG1 meeting #84bis, R1-162385, Agenda: 8.1.4.2, Intel Corporation, Apr. 11-15, 2016, pp. 1-4.
International Search Report and Written Opinion received for corresponding Patent Cooperation Treaty Application No. PCT/CN2016/083435, dated Mar. 2, 2017, 11 pages.
Extended European Search Report received for corresponding European Patent Application No. 16902694.5, dated Jan. 8, 2020, 9 pages.
"Non-Orthogonal Multiple Access for New Radio", 3GPP TSG-RAN WG1 meeting #85, R1-165019, Agenda: 7.1.3.2, Nokia, May 23-27, 2016, 6 pages.
"Overview of the Proposed Non-Orthogonal MA Schemes", 3GPP TSG-RAN WG1 meeting #85, R1-165018, Agenda: 7.1.3.2, Nokia, May 23-27, 2016, 7 pages.
Chinese Office Action corresponding CN Application No. 201680087987.2, dated Sep. 22, 2021.
European Communication pursuant to Article 94(3) EPC, corresponding to EP Application No. 16 902 694.5, dated Oct. 27, 2021.

\* cited by examiner

CODEWORD ADAPTATION FOR NON-ORTHOGONAL CODED ACCESS

RELATED APPLICATION

This application was originally filed as Patent Cooperation Treaty Application No. PCT/CN2016/083435 filed May 26, 2016.

BACKGROUND

Field

Various communication systems may benefit from improved transmissions. For example, a network utilizing non-schedule multiple access communications may benefit from improved communication link flexibility.

Description of the Related Art

Schedule based transmissions are used throughout 3rd Generation Partnership Project (3GPP) technology, such as Long Term Evolution (LTE), LTE-Advanced (LTE-A), High-Speed Downlink Packet Access (HSDPA), or other Evolved Universal Terrestrial Radio Access networks. Various schedule based transmissions may also be used in $5^{th}$ generation (5G) communications. Schedule based transmission can result in relative high latency due to the handshaking procedure between a user equipment and a network node.

FIG. 1 illustrates an example of an LTE uplink (UL) scheduling based data transmission process. In step 110, the UE may have data available in the logic buffer that it deems ready for UL transmission. The UE can then request uplink resources for the data transmission. This may be done by sending a scheduling request (SR) or a Physical Random Access Channel (PRACH) to a network node, such as an LTE eNode B (eNB), base station (BS), or 5G Node B (5GNB), in step 111.

In step 112, after the eNB successfully detects the SR or PRACH, the eNB may send an uplink grant to the UE. This UL grant can allocate certain physical uplink shared channel (PUSCH) resources for the UE to use in sending a buffer status report (BSR). The UE may then send the BSR, which can indicate the amount of data available in its logical buffer, after detecting the UL grant, in step 113. The eNB, in step 114, may then allocate and schedule uplink resources for the UE. In step 115, the eNB sends the UE a UL grant for the UL data transmission. The UE may use the allocated resources to transmit data to the eNB, in step 116, while taking the uplink radio conditions into account.

This scheduling based data transmission process can result in a relative high latency due to the handshaking procedures between the UE and the eNB. For example, in some cases it may take 17.5 milliseconds for LTE before any data can be transmitted. The process illustrated in FIG. 1 can also result in high overhead for the exchange of the several downlink or uplink control signaling messages. This process can be increasingly inefficient for massive UL small packet transmissions, such as those exhibited in 5G networks.

Non-scheduled multiple access may be introduced to improve the throughput and efficiency of traditional scheduled based uplink transmissions. For example, non-scheduled multiple access can reduce signaling overhead, lower latency, and lower power consumption at least for packet transmissions, including small packet transmissions, from various smartphone application, Voice over IP (VoIP), gaming, transmission control protocol (TCP) acknowledgement (ACK), and ultra-reliable and low-latency communications (URLLC) with real time remote control.

SUMMARY

A method in certain embodiments, may include selecting at a user equipment operating in a non-scheduled access scheme at least one of a first codeword or a second codeword based on an amount of data. The data in the non-scheduled access scheme can be spread according to a spreading sequence. The method may also include determining a transport block size for at least one of the first codeword or the second codeword. In addition, the method may include transmitting the data from the user equipment to a network node using at least one of the first codeword or the second codeword.

According to certain embodiments, an apparatus may include at least one memory including computer program code, and at least one processor. The at least one memory and the computer program code may be configured, with the at least one processor, to cause the apparatus at least to select at a user equipment operating in a non-scheduled access scheme at least one of a first codeword or a second codeword based on an amount of data. The data in the non-scheduled access scheme can be spread according to a spreading sequence. The at least one memory and the computer program code may also be configured, with the at least one processor, at least to determine a transport block size for at least one of the first codeword or the second codeword. In addition, the at least one memory and the computer program code may also be configured, with the at least one processor, at least to transmit the data from the user equipment to a network node using at least one of the first codeword or the second codeword.

An apparatus, in certain embodiments, may include means for selecting at a user equipment operating in a non-scheduled access scheme at least one of a first codeword or a second codeword based on an amount of data. The data in the non-scheduled access scheme can be spread according to a spreading sequence. The apparatus may also include means for determining a transport block size for at least one of the first codeword or the second codeword. In addition, the apparatus may include means for transmitting the data from the user equipment to a network node using at least one of the first codeword or the second codeword.

According to certain embodiments, a non-transitory computer-readable medium encoding instructions that, when executed in hardware, perform a process. The process may include selecting at a user equipment operating in a non-scheduled access scheme at least one of a first codeword or a second codeword based on an amount of data. The data in the non-scheduled access scheme can be spread according to a spreading sequence. The process may also include determining a transport block size for at least one of the first codeword or the second codeword. In addition, the process may include transmitting the data from the user equipment to a network node using at least one of the first codeword or the second codeword.

According to certain embodiments, a computer program product encoding instructions for performing a process according to a method including selecting at a user equipment operating in a non-scheduled access scheme at least one of a first codeword or a second codeword based on an amount of data. The data in the non-scheduled access scheme can be spread according to a spreading sequence. The method may also include determining a transport block size for at least one of the first codeword or the second codeword. In addition, the method can include transmitting the data from the user equipment to a network node using at least one of the first codeword or the second codeword.

A method, in certain embodiments, may include receiving data at a network node from a user equipment in a non-scheduled access scheme using at least one of a first codeword or a second codeword. The at least one of the first codeword or the second codeword can be based on an amount of the data. The data in the non-scheduled access scheme can be spread according to a spreading sequence. The method can also include decoding the second codeword.

According to certain embodiments, an apparatus may include at least one memory including computer program code, and at least one processor. The at least one memory and the computer program code may be configured, with the at least one processor, to cause the apparatus at least to receive data at a network node from a user equipment in a non-scheduled access scheme using at least one of a first codeword or a second codeword. The at least one of the first codeword or the second codeword can be based on an amount of the data. The data in the non-scheduled access scheme can be spread according to a spreading sequence. The at least one memory and the computer program code may also be configured, with the at least one processor, to cause the apparatus at least to decode the second codeword.

An apparatus, in certain embodiments, may include means for receiving data at a network node from a user equipment in a non-scheduled access scheme using at least one of a first codeword or a second codeword. The at least one of the first codeword or the second codeword can be based on an amount of the data. The data in the non-scheduled access scheme can be spread according to a spreading sequence. The apparatus may also include means for decoding the second codeword.

According to certain embodiments, a non-transitory computer-readable medium encoding instructions that, when executed in hardware, perform a process. The process may include receiving data at a network node from a user equipment in a non-scheduled access scheme using at least one of a first codeword or a second codeword. The at least one of the first codeword or the second codeword can be based on an amount of the data. The data in the non-scheduled access scheme can be spread according to a spreading sequence. The process may also include decoding the second codeword.

According to certain embodiments, a computer program product encoding instructions for performing a process according to a method including receiving data at a network node from a user equipment in a non-scheduled access scheme using at least one of a first codeword or a second codeword. The at least one of the first codeword or the second codeword can be based on an amount of the data. The data in the non-scheduled access scheme can be spread according to a spreading sequence. The method may also include decoding the second codeword.

BRIEF DESCRIPTION OF THE DRAWINGS

For proper understanding of the invention, reference should be made to the accompanying drawings, wherein.

DETAILED DESCRIPTION

Certain embodiments allow for a new link adaptation method, apparatus, computer program, or other embodiments for a non-schedule multiple access communication, such as a non-orthogonal coded access (NOCA). In certain embodiments, the UE can autonomously select a certain number of codewords for transmission based on an amount of data, for example, an incoming packet size. In addition, in certain embodiments, the UE may select the transport block size for each codeword.

Figure 1:
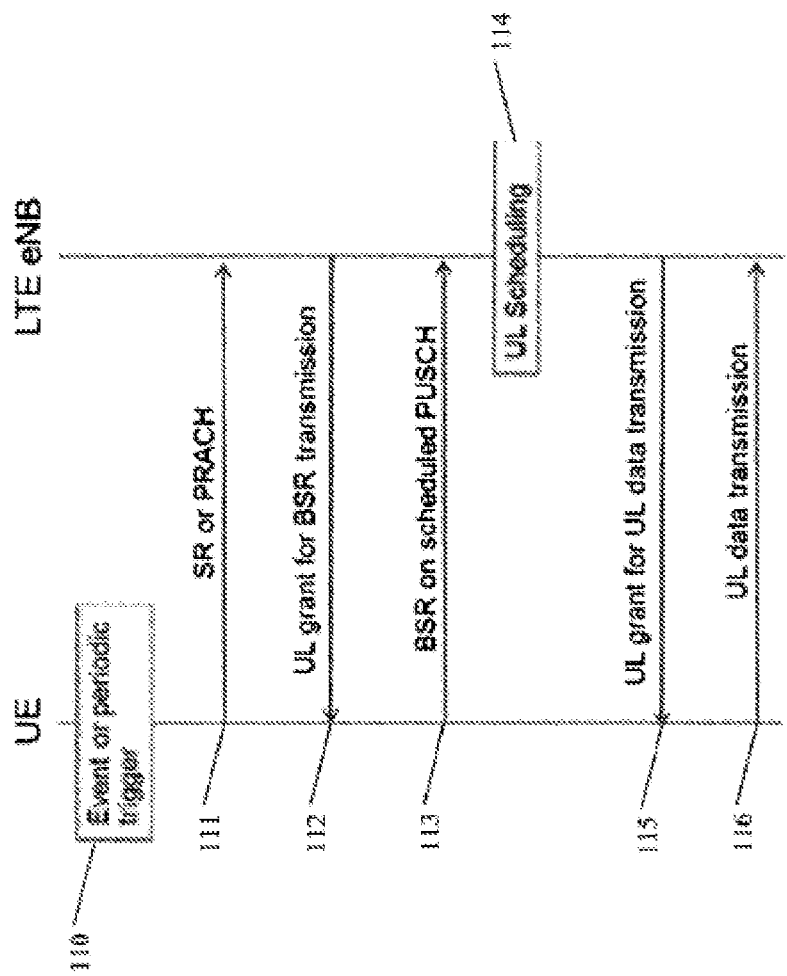
FIG. 1 illustrates an LTE UL scheduling based data transmission process.

NOCA is an example of a non-schedule multiple access communication. In certain embodiments, NOCA may have data symbols spread using non-orthogonal sequences before transmission. In other words, the UE can be assigned a spreading sequence for each codeword. Rather than scheduling a communication with a network node, as shown in FIG. 1, the UE can use the spreading sequence for UL transmissions. This embodiment may help the UE avoid the high latency period caused by scheduling a data transmission with a network node.

Figure 2:
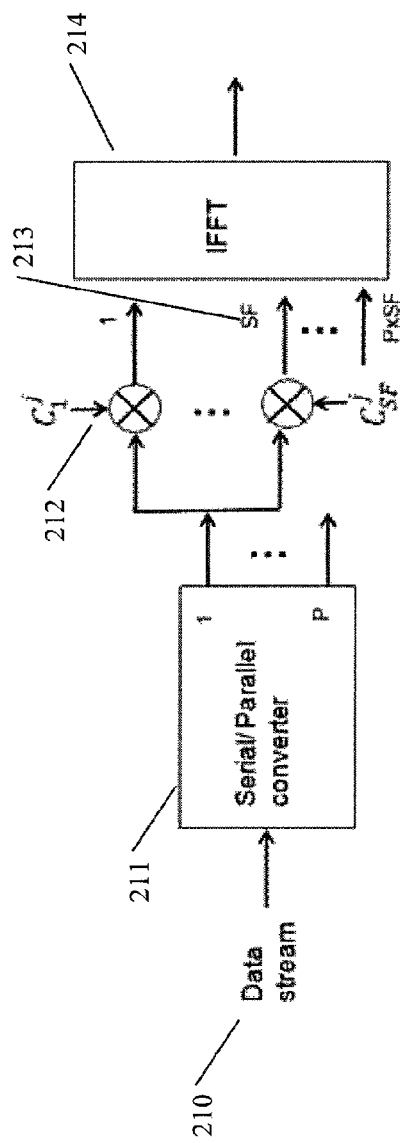
FIG. 2 illustrates a system according to certain embodiments.

FIG. 2 illustrates a system according to certain embodiments. In particular, FIG. 2 illustrates a NOCA transmitter, which may be located within a UE. A data or data stream 210 can be transmitted using the NOCA transmitter. Data 210 may be sent to a series-to-parallel converter 211. The series-to-parallel converter 211 may convert the data or data stream 210 into parallel sequences. P may represent the number of parallel sequences generated. C represents the spreading sequence 212, while j represents the number of users. The spreading sequence 212 can range from $C_1^j$ to $C_{SF}^j$. SF may represent the spreading factor 213.

As can be seen in FIG. 2, the original data or data stream 210 is first converted into P parallel sequences by a serial to parallel converter 211. Each parallel sequence may then be mapped to an SF subcarrier using a spreading sequence 212. The total number of used subcarriers may equal to the product of the number of parallel sequences and the number of SF subcarriers (P*SF).

In certain embodiments, the spreading sequences may be non-orthogonal. The non-orthogonal nature of the spreading sequences can allow the number of available spreading sequences to be larger than other orthogonal sequences. As a result, the number of packets that can be multiplexed on the same time-frequency resource, for example, a physical resource block, may increase. A resource pool (RP) may represent resources configured for non-scheduled access for a group of users.

Certain embodiments allow for the performance of efficient link adaptation for NOCA. The network node, in certain embodiments, may semi-statically allocate a modulation and coding scheme (MCS), a transport block size (TBS), and a RP to a specific user equipment. The packet size though may vary according to incoming traffic.

In cases in which the packet size is much smaller than the allocated TBS, however, padding bits may be inserted in the packet before encoding. Adding padding bit incurs unnecessary overhead. On the other hand, in cases in which the packet size is larger than the TBS, the packet may be segmented and transmitted in multiple transmission opportunities. Large number of transmission opportunities, instead of simply transmitting one packet, can lead to signal interference from other multiplexed UEs, larger inter-cell interference, and large collision probability among UEs.

In other embodiments, multiple MCS levels may be configured for the UE. This can allow the UE to autonomously select multiple TBS values. Such embodiments, however, can involve the network node having to blindly detect the used MCS level. This may increase the network resources used by the network node, and increase the complexity of the network node. The complexity may become even more severe when many multiplexed UEs utilizing the same resource pool.

In some embodiments, UEs may be provided with a link adaptation capability that may allow the UE to determine how many bits to transmit in each opportunity according to an amount of data, for example, a buffered packet size. In other words, the UE may determine a transport block size based on an amount of data to be transmitted.

As discussed above, certain embodiments allow new link adaptation for a non-scheduled access scheme, such as NOCA. Other embodiments may involve other non-scheduled multiple access schemes, for example, spare coded multiple access (SCMA), resource spread multiple access (RSMA), multi-user shared access (MUSA), non-orthogonal multiple access (NOMA), non-orthogonal coded multiple access (NCMA), pattern division multiple access (PDMA), and frequency domain spreading. The link adaptation may be achieved by allowing the UE to autonomously select the number of codewords to be used in a transmission. In some embodiments the UE may select only a single codeword, while in other embodiments the UE may select two or more codewords.

A codeword may be an independently encoded data block that together corresponds to a piece of information. The number of codewords used may be less than or equal to the number of layers. In certain embodiments, resource blocks associated with the same codeword may use the same MCS, even if the codeword is mapped to multiple layers. In addition, each codeword may be spread independently using at least one spreading sequence.

The UE can select a certain number of codewords. The number of codewords selected by the UE may be based on at least the amount of data in the uplink buffer of the UE. The UE may also select the number of codewords based on the size of the at least one resource pool of the codewords. Alternatively, or in addition to, the number of codewords may be based on the configured MCS for the UE. The MCS of the UE may in some embodiments be configured by a network node or another network entity located in the network.

In certain embodiments, the UE may select two codewords. The first codeword may be spread using a major sequence, for example, while the second codeword may be spread using an optional sequence, for example. The optional sequence may be termed optional because the second codeword may in certain embodiments only be used when the UE selects the second codeword. Both the major and optional sequences may be configured by the network node. The major sequence pool may be the resource pool of the first codeword, while the optional sequence pool may be the resource pool of the second codeword.

In some embodiments, the UE may use a different transmission power for the first codeword and for the second power. For example, there may be a predefined power offset between the transmission power for the first codeword and the transmission power for the second codeword.

In some embodiments, the network node, or any other network entity, may configure the major sequence from a major sequence pool. The optional sequence can then be determined or derived based on the configured major sequence in conjunction with the optional sequence pool. In certain embodiments, the major sequence pool and/or the optional sequence pool may be predefined or preconfigured by the network node, or any other network entity.

Figures 3A, 3B:
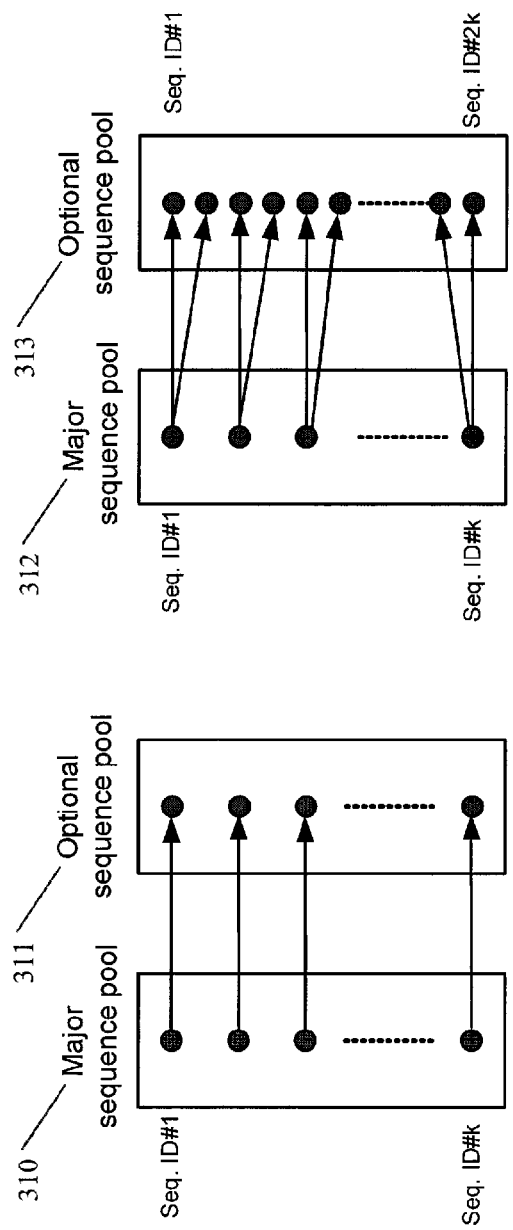
FIG. 3A illustrates a mapping diagram according to certain embodiments.
FIG. 3B illustrates a mapping diagram according to certain embodiments.

FIG. 3A illustrates a mapping diagram according to certain embodiments. In particular, FIG. 3A illustrates an example of a first codeword being spread using a major spreading sequence, and a second codeword being spread using an optional spreading sequence. Major sequence pool 310 can be the sequence pool from which the major sequence draws. Optional sequence pool 311, on the other hand, may be the sequence pool from which the optional sequence draws. In certain embodiments, a one-to-one mapping exists between the sequences in major sequence pool 310 and optional sequence pool 311. As can be seen in FIG. 3A, for example, the first sequence identification (Seq. ID #1) in the major sequence pool is mapped to a first sequence identification in the optional sequence pool. K represents the number of sequence identifications in the major sequence pool. This one-to-one mapping may be used by the UE to derive the optional spreading sequence from the major spreading sequence. The mapping between the major spreading sequence and the optional spreading sequence may be a predefined relationship. In some embodiments, the network node may be used to determine the predefined relationship and signal such relationship to the UE.

FIG. 3B illustrates a mapping diagram according to certain embodiments. In particular, FIG. 3B illustrates an example of a first codeword being spread using a major spreading sequence, and a second codeword being spread using an optional spreading sequence. Major sequence pool 312 can be the sequence pool from which the major sequence draws. Optional sequence pool 313, on the other hand, can be the sequence pool from which the optional sequence draws. Unlike FIG. 3A which illustrates a one-to-one mapping, FIG. 3B illustrates a one-to-multiple mapping, specifically a one-to-two mapping, between the sequences in major sequence pool 312 and optional sequence pool 313. As can be seen in FIG. 3B, for example, the first sequence identification (Seq. ID #1) in the major sequence pool is mapped to the first and second sequence identification in the optional sequence pool. This one-to-multiple mapping may be used by the UE to derive the optional spreading sequence from the major spreading sequence.

Associated sequences between major sequence pools 310, 312 and optional sequence pools 311, 313 may have a better correlation property than sequences within the same pool. As such, in embodiments in which the UE uses two codewords, the codewords being drawn from two different sequence pools can minimize inter-codeword interference. For example, if Zadoff-Chu (ZC) sequences are used in the network, the associated sequences may have same root, but different cyclic shifts. The ZC sequence may be expressed as follows:

$$x_q(m) = \exp\left(-\frac{j\pi qm(m+1)}{N}\right),$$

where q is the root of sequence, and m is the cyclic shift.

In certain embodiments, the network node, such as an eNB or any other base station, may signal a MCS of the UE for the first codeword. In certain embodiments, the UE may determine the number of information bits, or the transport block size, that the UE is capable of transmitting on the first codeword. This determination by the UE may be made based on the MCS and/or the resource pool size and/or the spreading factor. The UE may also decide the MCS for the second codeword. In some embodiments, the second codeword may be directly or explicitly indicated in the first codeword. In other embodiments, the second codeword may only be indirectly or implicitly indicated in the first codeword. The UE can then derive the MCS of the second codeword from the MCS of the first codeword. The MCS for the first codeword, for example, may define the upper limit of the available MCS for the second codeword, such that the MCS index for the second codeword may be below or equal to the MCS index of the first codeword.

Figure 4:
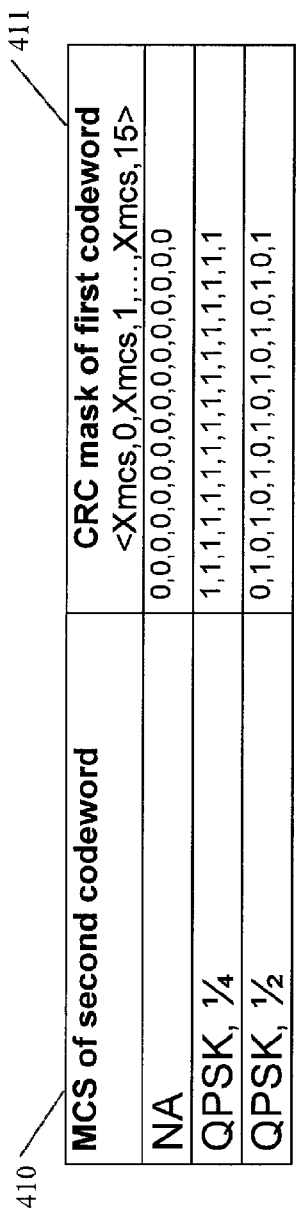
FIG. 4 illustrates a table according to certain embodiments.

In certain embodiments, the network node may determine or derive the presence of the second codeword from the first codeword. In such embodiments, the first codeword may include an indication of the existence and/or the MCS for the second codeword. The indication of the MCS for the second codeword, may take the form of a cyclic redundancy check (CRC) mask of the first codeword. FIG. 4 illustrates an example of a table according to certain embodiments. Specifically, FIG. 4 is an example of the CRC mask of the first codeword that may be used to indicate the existence and/or the MCS for the second codeword.

FIG. 4 has a first column indicating the MCS for the second codeword 410, and a second column indicating the CRC mask of the first codeword 411. Other embodiments of the CRC mask may include other columns having additional information. The first row of the table illustrates an embodiment in which the MCS of the second codeword is not available (NA). In other words, the first row indicates that the second codeword does not exist. The table in FIG. 4, therefore, exemplifies a CRC mask having two valid MCS levels. The first valid MCS level is a quadrature phase shift keyed (QPSK) ¼. The CRC mask of the first codeword indicating the MCS level of the second codeword can have a length of 16, for example, <Xmcs, 0, Xmcs, 1, ..., Xmcs, 15>. In other embodiments, the CRC length may be any other length. As can be seen in FIG. 4, the CRC mask of the first codeword for indicating that the MCS level is QPSK ¼ can be <1, 1, 1, 1, 1, 1, 1, 1, 1, 1, 1, 1, 1, 1, 1, 1>. The second valid MCS level is a QPSK ½. The CRC mask of the first codeword for indicating that MCS level is QPSK ¼ may be <0, 1, 0, 1, 0, 1, 0, 1, 0, 1, 0, 1, 0, 1, 0, 1>.

The network node may receive data from the UE using at least a first codeword and/or a second codeword. The network node may first detect the first codeword, and then attempt to detect the second codeword. In some embodiments, the network node may check the first codeword for an indication that the UE has transmitted two codewords. As a result, the network node will only attempt to decode the second codeword if the second codeword was actually transmitted from the UE.

In certain embodiments, the CRC mask may be included in both the first codeword and the second codeword. The CRC mask of the first codeword and/or the second codeword may indicate the existence of a future contention based transmission, such as the next contention based transmission. The CRC mask of the first codeword and/or the second codeword may also be used to indicate the number of contention based transmissions in a specified time period.

As mentioned above, the network node, or any other network entity, may be used to configure several features of the UE. For example, the MCS for the first codeword may be configured by the network node. Based on this MCS configuration, the UE may determine the transport block size for the first codeword. In some embodiments, the network node may also determine the spreading sequence for the first codeword and the spreading sequence for the second codeword. Alternatively, the network node may configure the spreading sequence for the first codeword, such as the major spreading sequence. The spreading sequence for the second codeword, for example, the optional spreading sequence, may then be determined based on the predefined relationship between the major sequence and the optional sequence. The network node may determine this predefined relationship. FIGS. 3A and 3B illustrate examples of relationships between the major sequence pool and the optional sequence pool.

In certain embodiments, the spreading sequence for the first codeword and/or the spreading sequence for the second codeword may be randomly selected by UE. Alternatively, the UE can randomly select the spreading sequence for the first codeword, such as the major spreading sequence. The spreading sequence for the second codeword, for example, the optional spreading sequence, can then be determined based on a predefined relationship between the major sequence and the optional sequence.

The spreading sequence for the first codeword, such as the major spreading sequence, might, in some embodiments, be determined from another transmitted sequence from UE, for example a preamble sequence before an uplink data transmission. For example, there may be a one-to-one mapping between the preamble sequence and the major spreading sequence. The spreading sequence for the second codeword, for example, the optional spreading sequence, may then be determined based on the predefined relationship between the major sequence and the optional sequence.

Figure 5:
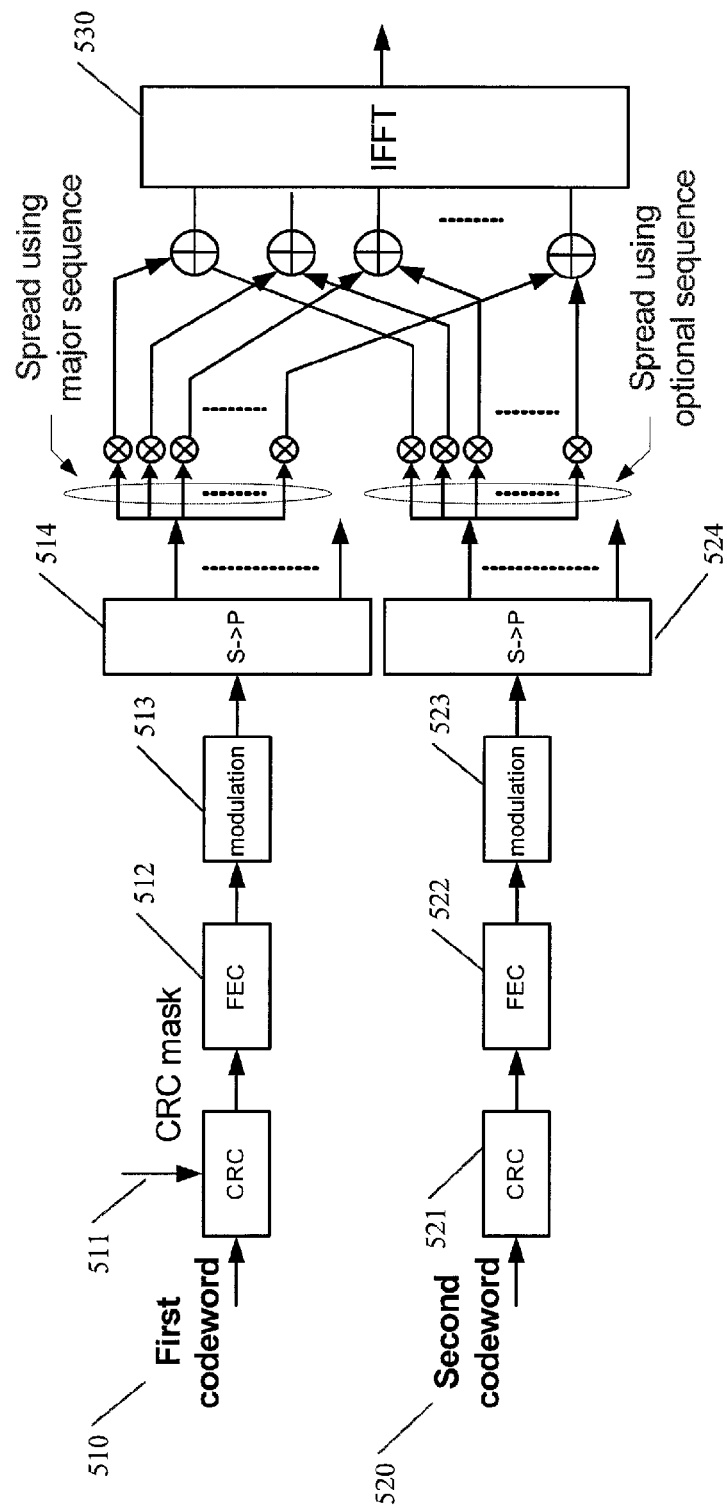
FIG. 5 illustrates a system according to certain embodiments.

FIG. 5 illustrates a system according to certain embodiments. In particular, FIG. 5 illustrates a transmitter structure in the UE in which the first codeword and the second codeword are autonomously, independently, and/or separately encoded, modulated, and spread. The spread signals from the first and second codewords may then be superposed before being sent to an inverse fast Fourier transform (IFFT) module. In certain embodiments, the first codeword and the second codeword are respectively spread by the major sequence and the optional sequence.

The first codeword 510 and the second codeword 511 encoding chains may be parallel to one another, as shown in FIG. 5. The first codeword 510 can be autonomously, independently, and separately encoded from the first codeword. The UE may use a CRC mask 511 to encode the MCS level of the second codeword in the first codeword 510. The network node can then determine or derive the MCS of the second codeword after detecting the CRC mask of the first codeword. In 512, the UE may use a forward error correction (FEC). FEC may be a technique used for controlling errors in data transmissions over unreliable or noisy communication channels. The first codeword 510 may then be modulated, in 513, and transmitted to a series-to-parallel converter 514, where the modulated data may be converted into a parallel sequence P.

In some embodiments, the first codeword may be spread using a major sequence. Similar to the process described in FIG. 2, the first codeword may then be mapped to an SF subcarrier in accordance with the spreading sequence.

The second codeword 520 may also be autonomously, independently, and separately encoded. As such, UE may use a CRC mask 521 to encode the existence of a future contention based transmission. In 522, the UE may apply a FEC function. The second codeword 520 may then be modulated, in 523, and transmitted to a series-to-parallel converter 524. In some embodiments, the second codeword may be spread using an optional sequence. The second codeword may then be mapped to an SF subcarrier in accordance with the spreading sequence. In certain embodiments, the second codeword and the first codeword may be mapped to the same SF subcarrier, meaning that the modulation symbols of the first and second codewords may be superposed. The superposed signals can then be sent to an IFFT module 530.

In certain embodiments, the entire bits of transport block of the first codeword and/or second codeword may be used to calculate the CRC parity bits for the respective codeword. The bits in a transport black may be represented by $a_0, a_1, a_2, a_3, \ldots, a_{A-1}$, and the CRC parity bits may be represented by $p_0, p_1, p_2, \ldots, p_{L-1}$. The parity bits may be computed and attached to the transport blocks. After attachment, the CRC bits may be scrambled according to the MCS configuration of the second codeword. The CRC bits may, for example, form the sequence of bits $c_0, c_1, c_2, c_3, \ldots c_{K-1}$, where $$c_k = a_k \text{ for } k=0,1,2,\ldots,A-1$$

$$c_k = (p_{k-A} + X_{mcs,k-A}) \bmod 2 \text{ for } k=A, A+1, A+2 \ldots, A+15,$$

where k is the index of the transmitted bits.

In certain embodiments, the UE may not be capable of having two simultaneous parallel encoding chains. In such an embodiment, the encoding of the first codeword and the second codeword may occur in series on a time domain. For example, the encoding and modulation of the first codeword can happen in a first transmission time interval (TTI #n) and superposed with the modulation symbols of the second codeword in a subsequent transmission time interval (TTI #n+1). This may allow both the first codeword and the second codeword sufficient time to be encoded in series.

The above embodiments provide for a process by which the UE operating in a NOCA may adapt communication links. For example, the number of codewords and the transport block size can be adaptively adjusted based on various factors, such as, the incoming packet size. Efficient link adaptation can help to avoid cases in which many padding bits are attached in a payload when the transmitted packet size is small. In such a small packet case, the UE may select only the first codeword, which can result in lower overhead. When the packet size is large, on the other hand, the UE can select a two codeword transmission. Using a two codeword transmission may allow for a large number of payload bits to be transmitted in one transmission time interval, and can help to reduce the number of transmission opportunities. Using a two codeword transmission may also help to lower interference in multiplexed signals transmitted from other UEs, lower inter-cell interference, and decrease the collision probability for the UEs.

As compared with having to configure multiple MCS levels to the UE, and relying on the blind detection of the network node of each MCS, the above embodiments may avoid multiple blind detections by the network node, leading to a decreased complexity of the network node. Decreasing the complexity of the network node may have an increasingly important role in massive connection use cases, such as those found in 5G networks.

Figure 6:
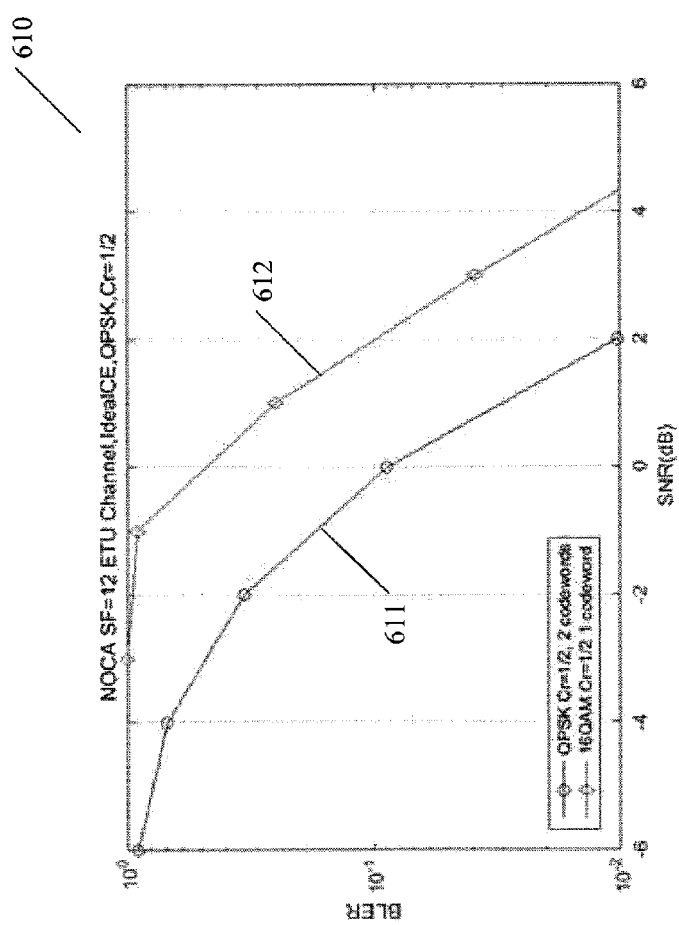
FIG. 6 illustrates a graph according to certain embodiments.

FIG. 6 illustrates a graph according to certain embodiments. In particular, FIG. 6 is a graph representing the block error rate comparison of a simulation result of one codeword versus two codewords under the same spectral efficiency. Line 611 represents a simulation of a UE having a lower MCS using two codewords, for example, a QPSK, ½. Line 611 has a better performance than lines 612, and represents a UE of a higher MCS with same spectral efficiency using one codeword, for example, a 16-quadrature amplitude modulation (QAM), ½. The spreading sequences of the first codeword and the second codeword may account for the higher efficiency of line 611.

Figure 7:
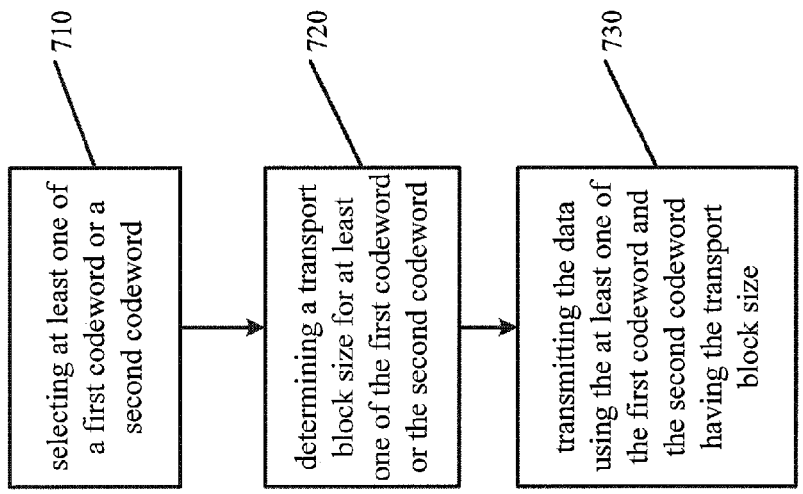
FIG. 7 illustrates a flow diagram according to certain embodiments.

FIG. 7 illustrates a flow diagram according to certain embodiments. In particular, FIG. 7 illustrates a flow diagram from the perspective of the UE. In step 710, the UE may select at least one of a first codeword or a second codeword based on an amount of data. The UE may operate in a non-scheduled access scheme, such as a non-orthogonal coded access. In a non-orthogonal coded access, data may be spread according to a spreading sequence. In certain embodiments, the UE can select a first codeword and/or a second codeword based on at least a size of the UL buffer at the UE, a size of the RP, or a MCS configured by a network entity.

In step 720, the UE may determine a transport block size for at least one of the first codeword and/or second codeword. The determination of the transport block size may be determined based on the amount of data, as well as whether the UE has selected one or two codewords. In step 730, the UE may transmit the data to the network node using at least one of the first codeword or the second codeword using the previously determined transport block size.

Figure 8:
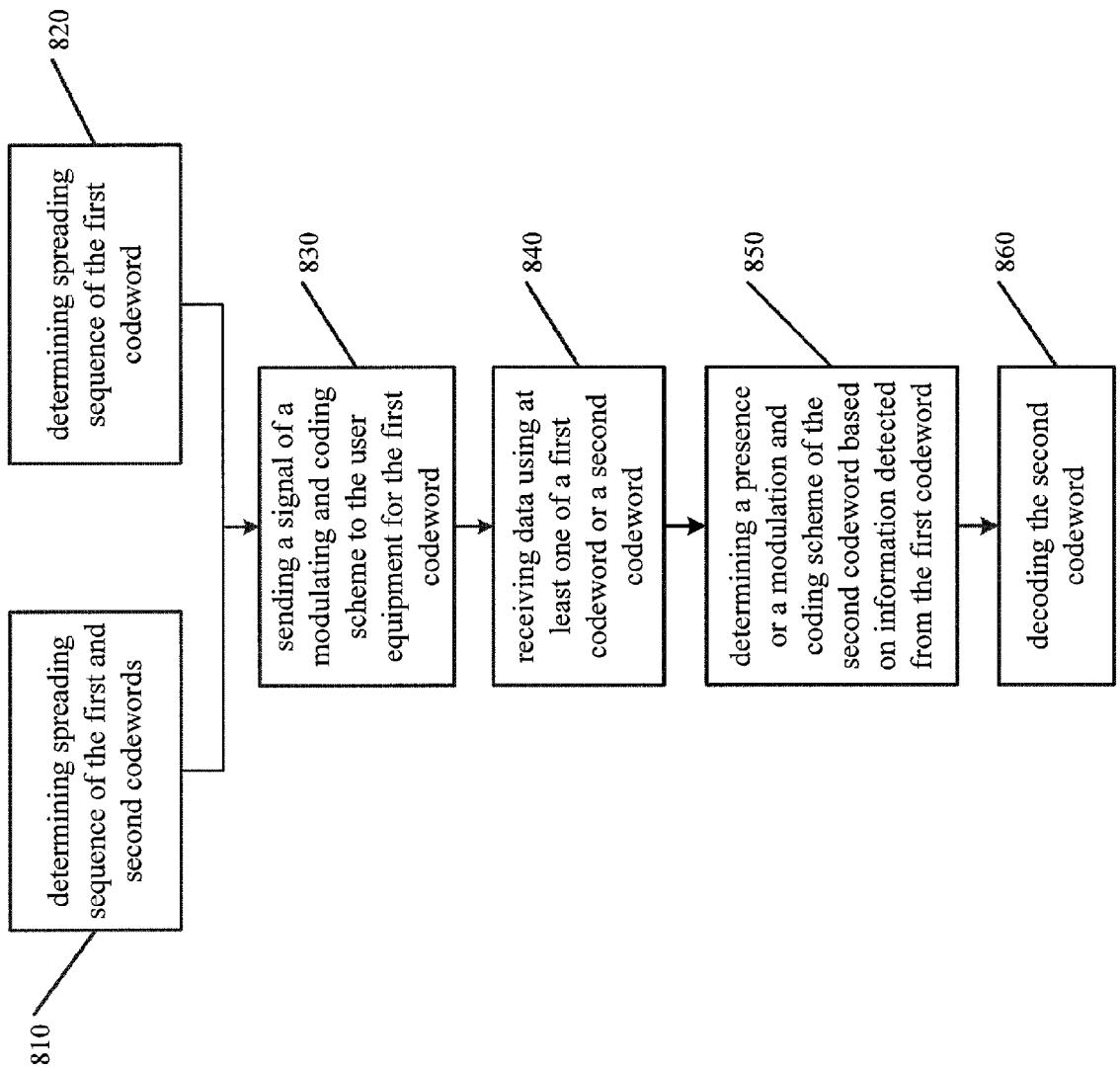
FIG. 8 illustrates a flow diagram according to certain embodiments

FIG. 8 illustrates a flow diagram according to certain embodiments. In particular, FIG. 8 illustrates a flow diagram from the perspective of the network node, for example, an access node, a base station, an eNB, an NB, or a 5GNB. In step 810, the network node may determine the spreading sequence for the first codeword and the second codeword. Alternatively, in step 820 the network node may determine the spreading sequence of the first codeword. The spreading sequence of the second codeword may then be derived from a predefined relationship between the first codeword and the second codeword. The predefined relationship may, in certain embodiments, be determined by the network node. In step 830, the network node may send a signal of the MCS to the UE for the first codeword.

The network node may then receive data using a first codeword and/or a second codeword, in step 840. The presence of the first and/or second codeword may be based on an amount of data. The UE, from which the data is received, may be operating in a non-scheduled access scheme, such as a NOCA. On the UE side, the data may be spread according to a spreading sequence. In step 850, the network node may determine a presence or a modulation and coding scheme of the second codeword based on information detected from the first codeword. In step 860, the network node may decode the second codeword. If the network node does not find an indication in the first codeword that two codewords were received by the network node, it will not to decode the second codeword. While the application refers to two codewords, the number of codewords is not limited to two codewords, and certain embodiments can include one codeword, two codewords, or more than two codewords. One of ordinary skill in the art will readily understand that the above steps may be performed in any order. In certain embodiments, at least one of steps 810, 820, 830, or 850 may not be performed.

Figure 9:
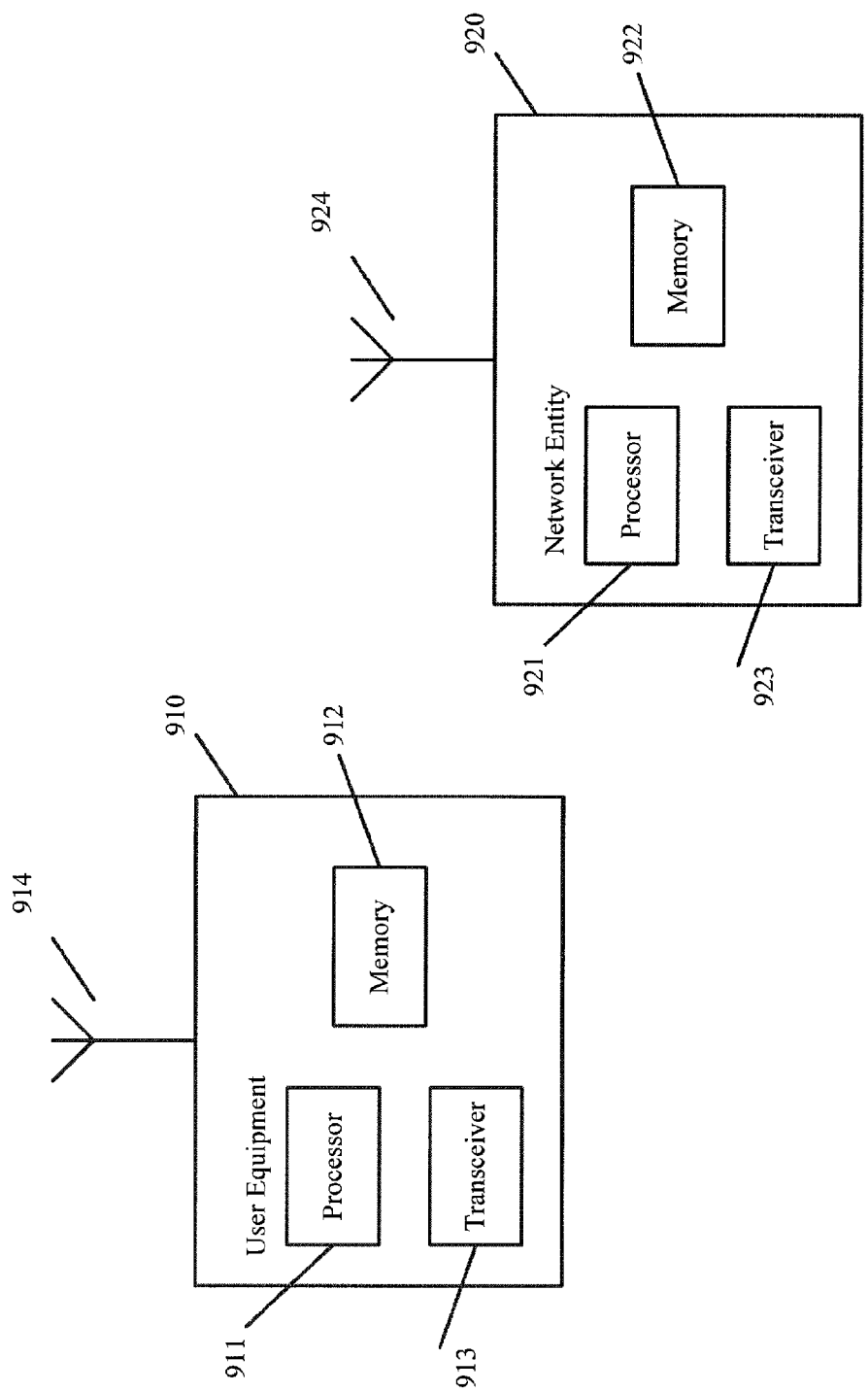
FIG. 9 illustrates a system according to certain embodiments.

FIG. 9 illustrates a system according to certain embodiments. It should be understood that each of FIGS. 2, 3A, 3B, 4, 5, 6, and each block in FIGS. 7 and 8 may be implemented by various means or their combinations, such as hardware, software, firmware, one or more processors and/or circuitry. In one embodiment, a system may include several devices, such as, for example, network entity 920 or UE 910. The system may include more than one UE 910 and more one network node 920, although only one access node shown for the purposes of illustration. A network entity may be an access node, a network node, or a base station, such as example, an eNB, a NB, a 5G NB, a server, a host, or any of the other access or network node discussed herein.

Each of these devices may include at least one processor or control unit or module, respectively indicated as 911 and 921. At least one memory may be provided in each device, and indicated as 912 and 922, respectively. The memory may include computer program instructions or computer code contained therein. One or more transceiver 913 and 923 may be provided, and each device may also include an antenna, respectively illustrated as 914 and 924. Although only one antenna each is shown, many antennas and multiple antenna elements may be provided to each of the devices. Other configurations of these devices, for example, may be provided. For example, network entity 920 and UE 910 may be additionally configured for wired communication, in addition to wireless communication, and in such a case antennas 914 and 924 may illustrate any form of communication hardware, without being limited to merely an antenna.

Transceivers 913 and 923 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner. In other words, division of labor may vary case by case. One possible use is to make a network node deliver local content. One or more functionalities may also be implemented as virtual application(s) in software that can run on a server.

A user device or user equipment 910 may be any electronic device, for example, a user equipment may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof.

In some embodiments, an apparatus, such as a user equipment or a network entity, may include means for carrying out embodiments described above in relation to FIGS. 2, 3A, 3B, 4A, 4B, 5, 6, 7, and 8. In certain embodiments, at least one memory including computer program code can be configured to, with the at least one processor, cause the apparatus at least to perform any of the processes described herein.

According to certain embodiments, an apparatus 910 may include at least one memory 912 including computer program code, and at least one processor 911. The at least one memory 912 and the computer program code are configured, with the at least one processor 911, to cause the apparatus 910 at least to select at a user equipment operating in a non-scheduled access scheme at least one of a first codeword or a second codeword based on an amount of data. The data in the non-scheduled access scheme may spread according to a spreading sequence The at least one memory 912 and the computer program code may be configured, with the at least one processor 911, to also cause the apparatus 910 at least to determine a transport block size for at least one of the first codeword or the second codeword. In addition, the at least one memory 912 and the computer program code may be configured, with the at least one processor 911, to cause the apparatus 910 at least to transmit the data from the user equipment to a network node using at least one of the first codeword or the second codeword.

According to certain embodiments, an apparatus 920 may include at least one memory 922 including computer program code, and at least one processor 921. The at least one memory 922 and the computer program code are configured, with the at least one processor 921, to cause the apparatus 920 at least to receive data at a network node from a user equipment operating in a non-scheduled access scheme using at least one of a first codeword or a second codeword. A presence of the at least one of the first codeword or the second codeword can be based on an amount of the data. The data in the non-scheduled access scheme can be spread according to a spreading sequence. The at least one memory 922 and the computer program code may be configured, with the at least one processor 921, to also cause the apparatus 920 at least to decode the second codeword.

Processors 911 and 921 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). Memories 912 and 922 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network entity 920 or UE 910, to perform any of the processes described above (see, for example, FIGS. 6, 7, and 8). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments may be performed entirely in hardware.

Furthermore, although FIG. 9 illustrates a system including a network entity 920 and UE 910, certain embodiments may be applicable to other configurations, and configurations involving additional elements, as illustrated and discussed herein. For example, multiple user equipment devices and multiple network entities may be present, or other nodes providing similar functionality, such as nodes that combine the functionality of a user equipment and a network entity, such as a relay node. The UE 910 may likewise be provided with a variety of configurations for communication other than communication network entity 920. For example, the UE 910 may be configured for device-to-device communication.

Certain embodiments described above may help provide a NOCA with a certain degree of flexibility, in which the UE can adapt communication links. As discussed above, the UE in certain embodiments may be able to select the number of codewords and adjust the transport block size based on, for example, the incoming packet size. This can allow the UE to reduce overhead, reduce the number of transmissions, lower inter-cell interference, and lower the collision probability among UEs.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

PARTIAL GLOSSARY

3 GPP 3rd generation project partner
LTE Long term evolution
5G 5th generation
eNB Enhanced node-B
BS Base Station
UE User equipment
UL Uplink
PRB Physical resource block
RP Resource pool
CB Contention based
MCS Modulation and coding scheme
TBS Transport block size
SR: Scheduling request
CRC Cyclic Redundancy Check
NOCA Non-orthogonal coded access
TTI Transmission time interval

What is claimed is:

1. An apparatus, comprising:
   at least one processor; and
   at least one memory including computer program code,
   wherein the at least one memory and computer program code are configured, with the at least one processor, to cause the apparatus at least to
   select, by the apparatus operating in a non-scheduled access scheme, a first codeword and a second codeword based on an amount of data, wherein the first codeword is spread using a major sequence, and the second codeword is spread using an optional sequence;
   determine a transport block size for the first codeword and the second codeword; and
   transmit the data to a network node using the first codeword and the second codeword,
   wherein the major sequence is configured from a major sequence pool, and the optional sequence is determined based on the major sequence and an optional sequence pool, and
   wherein there is a one-to-one mapping between a first sequence in the major sequence pool and a second sequence in the optional sequence pool, or there is a one-to-multiple mapping between a first sequence in the major sequence pool and a second sequence in the optional sequence pool.

2. The apparatus according to claim 1, wherein the selecting of the first codeword and the second codeword is based on at least one of a size of uplink buffer at the apparatus, a size of the resource pool, or a configured modulation and coding scheme.

3. The apparatus according to claim 1, wherein spread signals from the first codeword and second codeword are superposed.

4. The apparatus according to claim 1, wherein a transmission power offset exists between a spread signal of the first codeword and a spread signal of the second codeword.

5. The apparatus according to claim 1, wherein the major sequence pool and the optional sequence pool are predefined.

6. The apparatus according to claim 1, wherein the second codeword or a modulation and coding scheme of the second codeword is directly or indirectly derived from the first codeword.

7. The apparatus according to claim 1, wherein the determining of the transport block size is based on a modulation and coding scheme of the first codeword and the second codeword.

8. The apparatus according to claim 7, wherein the at least one memory and computer program code are configured, with the at least one processor, to cause the apparatus at least to
   use a cyclic redundancy check mask to indicate the modulation and coding scheme level of the second codeword.

9. The apparatus according to claim 1, wherein the first codeword and the second codeword are encoded separately.

10. The apparatus according to claim 1, wherein encoding of the first codeword and the second codeword occur in series on a time domain.

11. The apparatus according to claim 1, wherein the at least one memory and computer program code are configured, with the at least one processor, to cause the apparatus at least to randomly select the spreading sequence for the first codeword, or wherein the spreading sequence for the first codeword is determined from another transmitted sequence from the apparatus.

12. An apparatus, comprising:
at least one processor; and
at least one memory including computer program code,
wherein the at least one memory and computer program code are configured, with the at least one processor, to cause the apparatus at least to
receive data, from a user equipment in a non-scheduled access scheme, using a first codeword and a second codeword, wherein the first codeword and the second codeword are selected based on an amount of the data, and wherein the first codeword is spread using a major sequence, and the second codeword is spread using an optional sequence; and
decode the second codeword,
wherein the major sequence is configured from a major sequence pool, and the optional sequence is determined based on the major sequence and an optional sequence pool, and
wherein there is a one-to-one mapping between a first sequence in the major sequence pool and a second sequence in the optional sequence pool, or there is a one-to-multiple mapping between a first sequence in the major sequence pool and a second sequence in the optional sequence pool.

13. The apparatus according to claim 12, wherein the at least one memory and computer program code are configured, with the at least one processor, to cause the apparatus at least to
determine a presence or a modulation and coding scheme of the second codeword based on information detected from the first codeword.

14. The apparatus according to claim 12, wherein the at least one memory and computer program code are configured, with the at least one processor, to cause the apparatus at least to
send a signal of a modulation and coding scheme to the user equipment for the first codeword.

15. The apparatus according to claim 12, wherein the at least one memory and computer program code are configured, with the at least one processor, to cause the apparatus at least to
determine the major sequence of the first codeword and the optional sequence of the second codeword.

16. The apparatus according to claim 12, wherein the at least one memory and computer program code are configured, with the at least one processor, to cause the apparatus at least to
determine the major sequence of the first codeword, wherein the optional sequence of the second codeword is derived from a predefined relationship between the first codeword and the second codeword.

17. A method, comprising:
selecting, at a user equipment operating in a non-scheduled access scheme, a first codeword and a second codeword based on an amount of data, wherein the first codeword is spread using a major sequence, and the second codeword is spread using an optional sequence;
determining a transport block size for the first codeword and the second codeword; and
transmitting the data, from the user equipment to a network node, using the first codeword and the second codeword,
wherein the major sequence is configured from a major sequence pool, and the optional sequence is determined based on the major sequence and an optional sequence pool, and
wherein there is a one-to-one mapping between a first sequence in the major sequence pool and a second sequence in the optional sequence pool, or there is a one-to-multiple mapping between a first sequence in the major sequence pool and a second sequence in the optional sequence pool.

18. The method according to claim 17, wherein spread signals from the first codeword and second codeword are superposed.

* * * * *